United States Patent [19]

Tsukamoto et al.

[11] Patent Number: 4,572,130
[45] Date of Patent: Feb. 25, 1986

[54] METHOD OF CONTROLLING INDIVIDUAL CYLINDER FUEL INJECTION QUANTITIES IN ELECTRONICALLY CONTROLLED DIESEL ENGINE AND DEVICE THEREFOR

[75] Inventors: Keisuke Tsukamoto, Nagoya; Masaomi Nagase; Kiyotaka Matsuno, both of Toyota, all of Japan

[73] Assignee: Toyota Jidosha Kabushiki Kaisha, Toyota, Japan

[21] Appl. No.: 701,626

[22] Filed: Feb. 14, 1985

[30] Foreign Application Priority Data

Mar. 2, 1984 [JP] Japan ................................. 59-41059

[51] Int. Cl.4 ............................................ F02D 31/00
[52] U.S. Cl. .................................... 123/357; 123/502
[58] Field of Search ............... 123/357, 358, 359, 501, 123/502, 419

[56] References Cited

U.S. PATENT DOCUMENTS

| | | | |
|---|---|---|---|
| 4,372,266 | 2/1983 | Hejama et al. | 123/357 |
| 4,375,668 | 3/1983 | Leung et al. | 123/419 |
| 4,476,832 | 10/1984 | Fujimori et al. | 123/357 |
| 4,493,302 | 1/1985 | Kawamura | 123/357 |
| 4,497,294 | 2/1985 | Izumi et al. | 123/357 |

FOREIGN PATENT DOCUMENTS

| | | | |
|---|---|---|---|
| 138236 | 8/1983 | Japan | 123/357 |
| 214627 | 12/1983 | Japan | 123/357 |

*Primary Examiner*—Magdalen Y. C. Moy
*Attorney, Agent, or Firm*—Kenyon & Kenyon

[57] ABSTRACT

In effecting individual cylinder fuel injection control in an electronically controlled diesel engine, wherein rpm variations with every explosion cylinder are detected and compared with one another, and a fuel injection quantity control actuator is controlled with every cylinder so as to make the rpm variations of respective cylinders uniform, so that engine vibrations due to a dispersion in fuel injection quantity between the cylinders can be controlled, a movement value corrected driving command timing to the fuel injection quantity control actuator is determined in accordance with a difference between individual cylinder correction quantities of last time and this time and a driving command is given to the fuel injection quantity control actuator with every cylinder in accordance with the movement value corrected driving command timing.

4 Claims, 16 Drawing Figures

METHOD OF CONTROLLING INDIVIDUAL CYLINDER FUEL INJECTION QUANTITIES IN ELECTRONICALLY CONTROLLED DIESEL ENGINE AND DEVICE THEREFOR

BACKGROUND OF THE INVENTION

1. Field of the Invention

This invention relates to a method of controlling individual cylinder fuel injection quantities in an electronically controlled diesel engine and a device therefor, and particularly to improvements in a method of controlling individual cylinder fuel injection quantities in an electronically controlled diesel engine and a device therefor, suitable for use in an electronically controlled diesel engine in a motor vehicle, wherein rpm variations with every explosion cylinder are detected and compared with one another, and a fuel injection quantity control actuator is controlled with every cylinder so as to make the rpm variations of respective cylinders uniform, so that engine vibrations due to a dispersion in fuel injection quantity between the cylinders can be reduced.

2. Description of the Prior Art

In general, the vibrations of a diesel engine during idling are by far higher than those of a gasoline engine. The diesel engine resiliently supported by an engine mounting mechanism resonates with the engine vibrations, resulting in not only worsening the comfortableness of a vehicle, but also adversely affecting components around the engine. This is mainly caused by the vibrations of the primary/secondary low frequencies attributed to periodical dispersions of the fuel fed under pressure to the respective cylinders at a cycle only half the turn of the diesel engine when the diesel engine is of four cycle type for example. More specifically, in a diesel engine, if a dispersion occurs in the fuel injection quantity between the cylinders, then, as shown in FIG. 1, the rpm variations $\Delta$ NE between the explosion cylinders (in the case of the engine of four cylinders, 180° CA (crank angle)) are not equal to one another, whereby surging S of deviations about a crank occurs at a cycle of every four explosions, which surge gives an uncomfortable feeling to an occupant of a vehicle. In the drawing, designated at TDC is a top dead center.

For this, it is conceivable that an engine body, a fuel injection pump and an injection nozzle are manufactured with very high accuracies, so that a dispersion in fuel quantities fed to respective cylinders can be reduced. However, to achieve this, great difficulties in production engineering are encountered, and a fuel injection pump and the like become very expensive. On the other hand, it is also conceivable that an engine mounting mechanism is improved so as to reduce the vibrations of the engine. However, the mounting mechanism becomes complicated and expensive, and further, the vibrations of the diesel engine itself are not reduced thereby, thus not enabling to offer the fundamental solution of the problem.

To obviate the above-described problem, it is conceivable that an NE raw wave form is obtained by a gear 20 secured to a drive shaft 14 of a fuel injection pump 12 and an engine rotation sensor 22 mounted to a pump housing 12A as shown in FIG. 2 for example, an engine speed NEi(i=1 to 4) through a rotation of 45° CA immediately before the cylinder to be corrected is calculated from the time duration $\Delta T$ needed for the rotation through 45° CA, i.e. the rotation through 22.5° PA (pump angle) (45° CA of the engine) of the drive shaft 14 for example, which is detected by a fall of an NE pulse having formed the NE raw wave form as shown in FIG. 3, an rpm variation $DNE_p(p=1$ to 4) with every explosion cylinder is detected from the engine speed NEi as shown in FIG. 4, the resultant value is compared with a mean value (hereinafter referred to as a "mean rpm variation")

$$WNDLT\left( = \sum_{P=1}^{4} DNE_p/4 \right)$$

of the rpm variations of all of the cylinders, when the rpm variation of the cylinder is smaller than the mean rpm variation WNDLT, the fuel injection quantity of the cylinder is regarded to be small, a fuel injection quantity (hereinafter referred to as an "everytime correction quantity") $\Delta q$ to be increased is learned in accordance with a difference (hereinafter referred to as an "rpm variation difference") DDNEp(p=1 to 4), as shown in FIG. 5 for example, and reflected at the time of a subsequent fuel injection of the cylinder. On the contrary, when the rpm variation of the cylinder is larger than the mean rpm variation WNDLT, to decrease the fuel injection quantity of the cylinder. A fuel injection control actuator, such for example as a spill actuator for controlling a spill ring in a distribution type fuel injection pump is controlled with every cylinder until the rpm variations of the respective cylinders become uniform as illustrated in FIG. 6 for example, whereby the fuel injection quantity is increased or decreased with every cylinder, so that the dispersion in fuel injection quantity between the cylinders can be obviated, thereby enabling to reduce the engine vibrations.

Referring to FIG. 6, $\Delta Q_p(p=1$ to 4) is an individual cylinder correction quantity as being an integrated value of the everytime correction quantities $\Delta q$, $K_5$ is a coefficient of correction for preventing hunting when the engine speed is within a range between 1000 rpm and 1500 rpm during neutral position, wherein the higher the engine speed is, the lower the individual cylinder correction quantity is made, $Q_{fin}$ is an injection quantity calculated from a mean engine speed NE, an accelerator opening Accp and the like, and Vsp is an output from a spill position sensor for detecting a displacement of the spill actuator.

However, since a command timing to a spill actuator has heretofore been constantly set at about 160° CA (crank angle) before the injection of a cylinder to be corrected, although no problem has arisen when a difference between individual cylinder correction quantities of last time and this time is small and a spill ring movement is small as in the case where a cylinder number counter P is renewed in a sequence of 2 to 3 as shown in FIG. 7. However, when the difference in the cylinder correction quantities of last time and this time is large, namely, a dispersion in injection quantity between the cylinders is high and the spill ring movement is large as in the case where the cylinder number counter p is renewed in a sequence of 3 to 4 as shown in FIG. 7, a so called delay in reach, wherein the injection is begun before the spill ring reaches a command movement value of the cylinder to be corrected, occurs, so that the difference in injection quantity cannot be corrected, thus presenting a disadvantage of increased engine vibrations.

SUMMARY OF THE INVENTION

The present invention has been developed to obviate the disadvantages of the prior art and has as its object the provision of a method of controlling individual cylinder fuel injection quantities in an electronically controlled diesel engine, wherein, even when a difference between the individual cylinder correction quantities of last time and this time is large and a movement value of a fuel injection quantity control actuator is large, a delay in reach of the fuel injection quantity control actuator can be prevented, so that vibrations and surging in the engine can be efficiently reduced, and a device therefor.

To this end, the present invention contemplates that, in a method of controlling individual cylinder fuel injection quantities in an electronically controlled diesel engine, wherein rpm variations with every explosion cylinder are detected and compared with one another, and a fuel injection quantity control actuator with every cylinder is controlled so as to make the rpm variations of the cylinders uniform, so that engine vibrations due to a dispersion in fuel injection quantity between the cylinders can be reduced, as the technical gist thereof is illustrated in FIG. 8, the method comprises the steps of:

calculating a difference between the individual cylinder correction quantities of last time and this time;

determining a movement value corrected driving command timing to the fuel injection quantity control actuator in accordance with the difference; and giving a driving command to the fuel injection quantity control actuator with every cylinder in accordance with the movement value corrected driving command timing.

To the above end, the present invention contemplates that, in a device for controlling individual cylinder fuel injection quantities in an electronically controlled diesel engine, the device comprises:

a fuel injection pump including a spill ring and a spill actuator, for controlling fuel injection quantities;

injection nozzles for injecting fuel discharged from the fuel injection pump into combustion chambers;

an accelerator sensor for detecting an accelerator opening;

an engine rotation sensor for detecting an engine speed; and a control unit for determining a target injection quantity at least from the accelerator opening and the engine speed, controlling the spill actuator so that the fuel of the target injection quantity can be discharged from the fuel injection pump, determining a movement value corrected driving command timing to the spill actuator in accordance with a difference between the individual cylinder correction quantities of last time and this time, and giving a driving command for eliminating a dispersion in rpm variations with every cylinder to the spill actuator in accordance with the movement value corrected driving command timing.

A specific form of the present invention is of such an arrangement that, the larger the difference is, the earlier the movement value corrected driving command timing is made, so that a proper control can be effected in accordance with the difference.

Another specific form of the present invention is of such an arrangement that the movement value corrected driving command timing is guarded by an engine speed corrected driving command timing obtained such that, the higher the engine speed is, the earlier the engine speed corrected driving command timing is made, so that a proper control can be effected in consideration of the engine speed.

According to the present invention, the movement value corrected driving command timing to the fuel injection quantity control actuator is determined in accordance with the difference in the individual cylinder correction quantities of last time and this time and a driving command is given to the fuel injection quantity control acuator with every cylinder in accordance with the movement value corrected driving command timing, so that, even when the difference between the individual cylinder correction quantities of last time and this time is large and the movement value of the fuel injection quantity control actuator is large, a delay in reach of the fuel injection quantity control actuator can be prevented. In consequence, a dispersion in valve opening pressure of the nozzles, a dispersion in injection quantity characteristics of the fuel injection pump between the cylinders, a dispersion in injection quantity between the cylinders due to change with time and the like can be efficiently absorbed. Therefore, the deviations about a crank and surging thereof during idling and the like can be reduced, so that the uncomfortable feeling which otherwise would be given to an occupant in a vehicle can be avoided. Furthermore, the strict quality control such as classified assembling of injection nozzles can be dispensed with, thus enabling to achieve the cost-down.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of embodiments of the electronically controlled diesel engine in a motor vehicle, to which is applied the method of controlling individual cylinder fuel injection quantities according to the present invention, with reference to the drawings.

Figure 9:
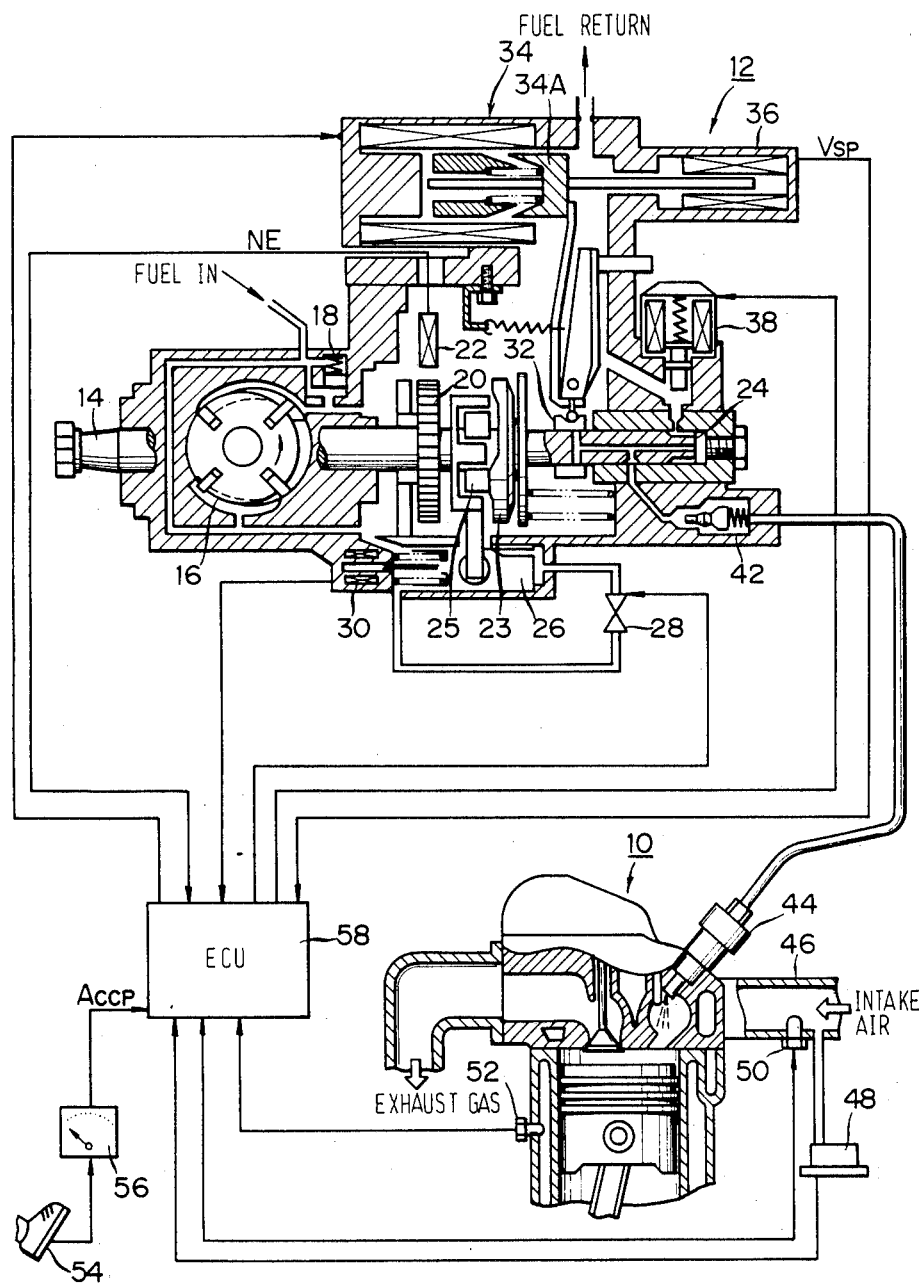
FIG. 9 is a sectional view, partially including a block diagram, showing the general arrangement of an embodiment of the electronically controlled diesel engine in a motor vehicle, to which the present invention is applied.

As shown in FIG. 9, the first embodiment of the present invention comprises:

a distribution type fuel injection pump 12 including a drive shaft 14 rotatable in association with the rotation of a crankshaft of a diesel engine 10, a feed pump 16 (FIG. 9 shows a state of the feed pump unfolded through 90°) solidly secured to the drive shaft 14, for feeding the fuel under pressure, a fuel pressure regulating valve 18 for regulating fuel feeding pressure, an engine rotation sensor 22 formed of an electromagnetic pickup for example, for detecting the rotating condition of a diesel engine 10 from a rotary displacement of a gear 20 solidly secured to the drive shaft 14, a roller ring 25 for driving a pump plunger 24 in cooperation with a face cam 23, a timer piston 26 (FIG. 9 shows a state of the timer piston unfolded through 90°) for controlling the rotational position of the roller ring 25, a timing controlling valve 28 for controlling the position of the timer piston 26 to control the fuel injection timing, a timer position sensor 30 formed of a variable inductance sensor for example, for detecting a position of the timer piston 26, a spill ring 32 for controlling the fuel spill timing from the pump plunger 24, a spill actuator 34 for controlling the position of the spill ring 32 to control the fuel injection quantity, a spill position sensor 36 formed of a variable inductance sensor for example, for detecting a position Vsp of the spill ring 32 from a displacement of a plunger 34A of the spill actuator 34, a fuel cutting solenoid (hereinafter referred to as an "FCV") 38 for cutting the fuel during stop of the engine in operation, and a delivery valve 42 for preventing the counterflow and after-dripping of fuel;

injection nozzles 44 for injecting the fuel discharged from the delivery valve 42 of the fuel injection pump 12 into combustion chambers of the diesel engine 10;

an intake air pressure sensor 48 for detecting the pressure of intake air taken in through an intake pipe 46;

an intake air temperature sensor 50 for detecting the temperature of the intake air;

a coolant temperature sensor 52 provided on a cylinder block of the engine 10, for detecting engine coolant temperature;

an accelerator sensor 56 for detecting a depressing angle (hereinafter referred to as an "accelerator opening") Accp of an accelerator pedal 54 operated by a driver; and an electronic control unit (hereinafter referred to as an "ECU") 58 for determining a target injection timing and a target injection quantity from the accelerator opening Accp detected from an output of the accelerator sensor 56, the engine speed NE obtained from an output of the engine rotation sensor 22, the engine coolant temperature detected by the coolant temperature sensor 52 and so on, and for controlling the timing controlling valve 28, the spill actuator 34 and the like, so that the fuel of the target injection quantity can be injected from the fuel injection pump 12 at the target injection timing.

Figure 10:
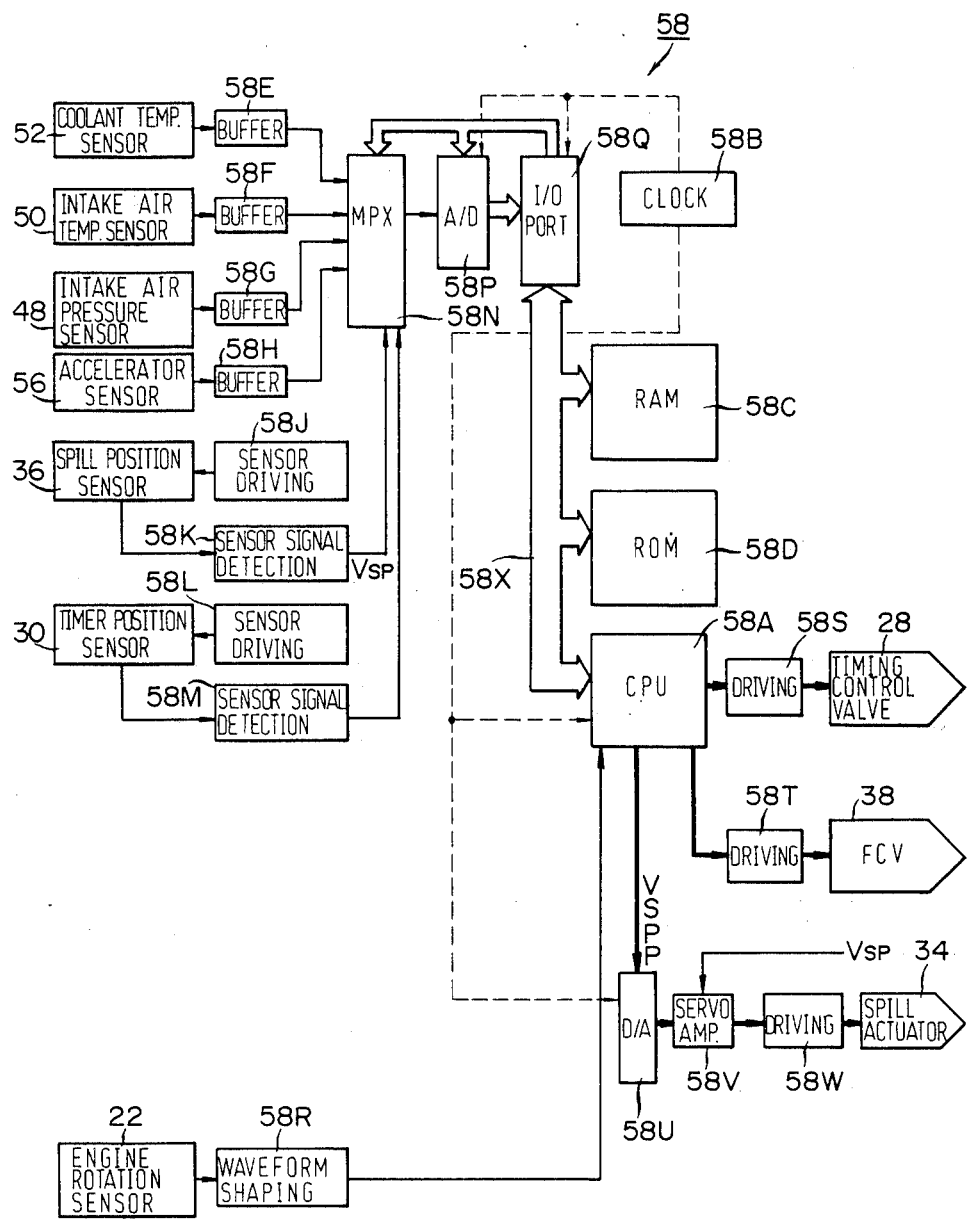
FIG. 10 is a block diagram showing the arrangement of the electronic control unit used in the embodiment.

As detailedly shown in FIG. 10, the ECU 58 comprises:

a central processing unit (hereinafter referred to as a "CPU") 58A formed of a microprocessor for example, for performing various operations and processings;

a clock 58B for generating various clock signals;

a random access memory (hereinafter referred to an a "RAM") 58C for temporarily storing operational data and the like in the CPU 58A;

a read only memory (hereinafter referred to as a "ROM") 58D for storing control programs, various data and the like;

a multiplexer (hereinafter referred to as an "MPX") 58N for successively taking in an output from the coolant temperature sensor 52, which is inputted through a buffer 58E, an output from the intake air temperature sensor 50, which is inputted through a buffer 58F, an output from the intake air pressure sensor 48, which is inputted through a buffer 58G, an output from the accelerator sensor 56, which is inputted through a buffer 58H, the output Vsp from the spill position sensor 36, which is driven in response to a sensor driving frequency signal outputted from a sensor driving circuit 58J, and inputted through a sensor signal detecting circuit 58K, an output from the timer position sensor 30, which is driven in response to a sensor driving frequency signal outputted from a sensor driving eircuit 58L, and inputted through a sensor signal detecting circuit 58M and so on;

an analogue-digital converter (hereinafter referred to as an "A/D converter") 58P for converting analogue signals outputted from the MPX 58N into digital signals;

an input-output port (hereinafter referred to as an "I/0 port ") 58Q for taking an output from the A/D converter 58P into the CPU 58A;

a waveform shaping circuit 58R for waveform-shaping an output from the engine rotation sensor 22 and directly taking the same into the CPU 58A;

a driving circuit 58S for driving the timing controlling valve 28 in accordance with the result of operation of the CPU 58A;

a driving circuit 58T for driving the FCV 38 in accordance with the result of operation of the CPU 58A;

a servo amplifter 58V and a driving dircuit 50W, for driving the spill actuator 34 in accordance with a deviation between a spill position signal Vsp outputted from the spill position sensor 36 and an output from the CPU 58A, which is converted into an analogue signal by a digital-analogue converter (hereinafter referred to as a "D/A converter") 58U; and a common bus 58X for connecting the above-mentioned components to one another.

Description will hereunder be given of action of the embodiment.

Figure 11:
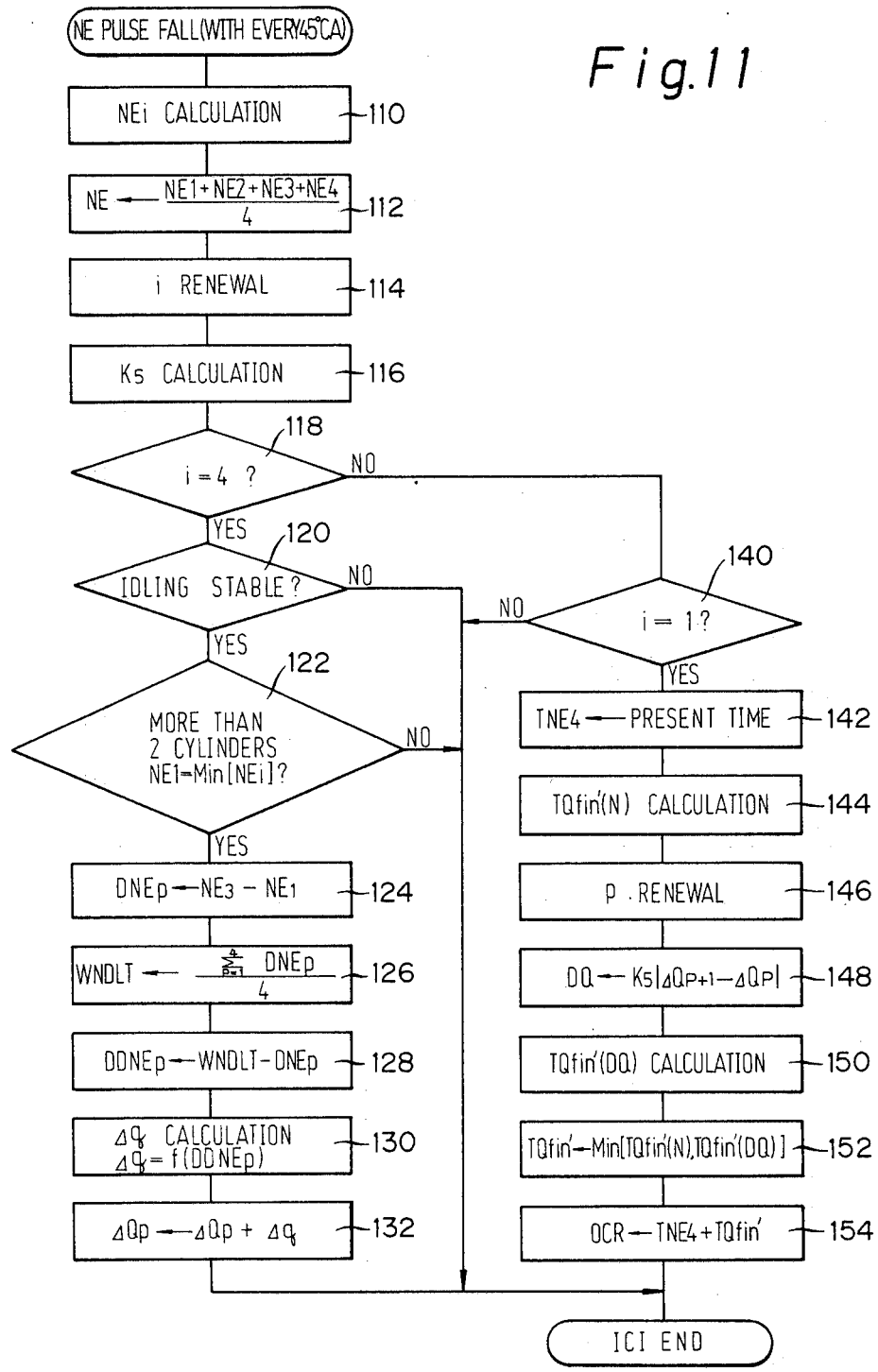
FIG. 11 is a flow chart showing the input capture interrupt routine for determining the individual cylinder injection quantities and final injection timings.

Calculation of the individual cylinder correction quantities $\Delta Qp$ and a final driving command timing TQfin' in the embodiment is carried out by an input capture interrupt routine ICI passing with every 45° CA as shown in FIG. 11.

Figure 1:
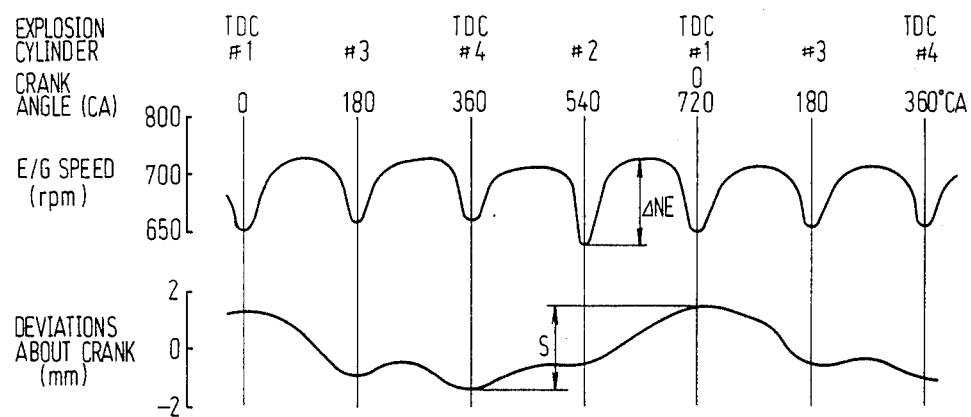
FIG. 1 is a graphic chart showing the relationship between the rpm variation and surging of deviations about the crank in the conventional electronically controlled diesel engine.
Figure 2:
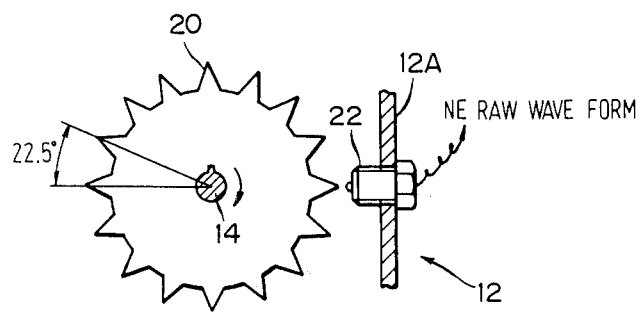
FIG. 2 is a sectional view showing the arrangement of the engine rotation sensor used in the conventional electronically controlled diesel engine.
Figure 3:
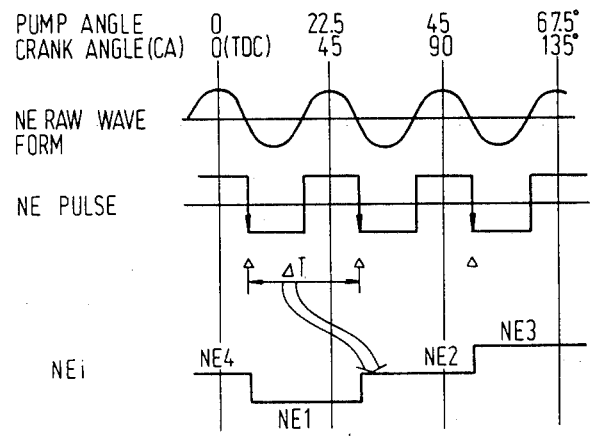
FIG. 3 is a graphic chart showing the conventional method of determining the engine speed through 45° CA.

More specifically, simultaneously with a fall of an NE pulse outputted with every 45° CA from the engine rotation sensor 22, the routine proceeds to Step 110, and, as shown in FIG. 3, an engine speed $NE_i (i=1$ to 4) with every 45° CA is calculated from a time duration $\Delta T$ from a fall of NE pulse of the last time to a fall of NE pulse of this time. A counter i is renewed in a sequence of 1 - 2 - 3 - 4 - 1 by falls of NE pulses, whereby this engine speed NEi is renewed in a sequence of $NE_1$ - $NE_2$ - $NE_3$ - $NE_4$ - $NE_1$ with every 180° CA and stored in the respective memories.

Subsequently, the routine proceeds to Step 112, where a mean engine speed NE through 180° CA is calculated as shown in the following equation.

$$NE = (NE_1 + NE_2 + NE_3 + NE_4)/4 \qquad (1)$$

Figure 12:
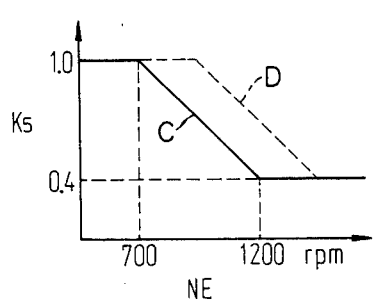
FIG. 12 is a graphic chart showing an example of the relationship between the engine speed and the coefficient of correction as used in the input capture interrupt routine.

Then, the routine proceeds to Step 114, where the counter i is renewed, and thereafter, in Step 116, a coefficient of correction $K_5$ corresponding to the engine speed NE, for preventing the hunting when the engine speed is relatively high, such as 1000rpm -1500rpm, is calculated from a map having the relationship indicated by broken lines D in FIG. 12, which is previously stored in the ROM 58D.

Since the coefficient of correction $K_5$ can take a value larger than $K_5$ (solid line C) which has been used in the example of the prior art as shown in FIG. 12, the correction can be performed more accurately. This is because the hunting of the engine rotations at the time of 1000rpm -1500rpm is mainly caused by a delay in reach of the spill ring, whereby, if the reach in delay can be prevented as in this embodiment, the scope between the upper and lower limits of the individual cylinder correction quantity can be widened accordingly.

Figure 4:
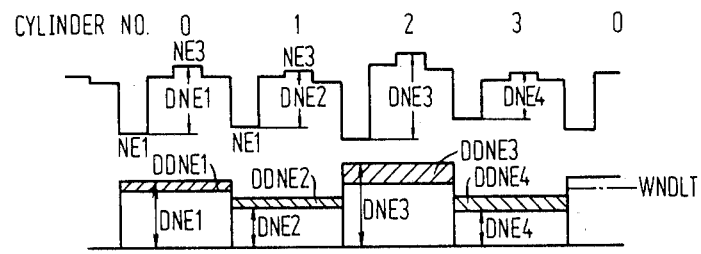
FIGS. 4 and 5 are graphic charts showing the conventional method of determining individual cylinder correction quantities.

Subsequently, the routine proceeds to Step 118, where judgment is made as to whether the counted value of the counter i is 4 or not. When the result of judgment is positive, namely, it is immediately after the renewal in a sequence of 3 to 4 of the counter i, the routine proceeds to Step 120, where judgment is made as to whether the idling is in the stable state or not. When the result of judgment is positive, namely, there are established all of such conditions that it is neither the time of starting nor the time immediately after the starting (i.e. starting time quasi-accelerator opening AccpA —0), the accelerator opening Accp is 0%, the shift position of a transmission is neutral or a drive range is selected and the vehicle speed is zero in the case of a vehicle provided with an automatic transmission, for example, the routine proceeds to Step 122, where judgment is made as to whether there are two or more cylinders, in which the engine speed $NE_1$ is the minimum value out of $NE_1 - NE_4$ for one and the same cylinder p or not. When the result of judgment is positive, namely, it is judged that no misfire and the like occur and the rotation is in the stable conditions, the routine proceeds to Step 124, where rpm variations $DNE_p (p=1$ to 4) corresponding to the respective cylinders are calculated through the following equation, as shown in FIG. 4, and stored in the respective memories.

$$DNE_p \leftarrow NE_3 - NE_1 \qquad (2)$$

Herein, a counter p is associated with the respective cylinders, when the counter i is changed in a sequence of 4 to 1, the renewals in a sequence of 1 - 2 - 3 - 4 - 1 are made, and one turn is completed through 720° CA.

Subsequently, the routine proceeds to Step 126, where a mean value WNDLT of rpm variations is calculated through the following formula and stored.

$$WNDLT \leftarrow \sum_{p=1}^{4} DNE_p/4 \qquad (3)$$

Then, the routine proceeds to Step 128, where a deviation $DDNE_p$ between the mean rpm variation WNDLT and the rpm variation $DNE_p$ of the respective cylinders is calculated through the following formula.

$$DDNE_p \leftarrow WNDLT - DNE_p \qquad (4)$$

Figure 5:
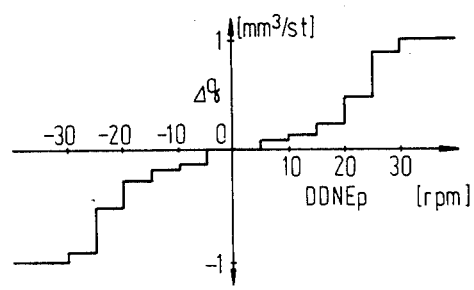
Figure 6:
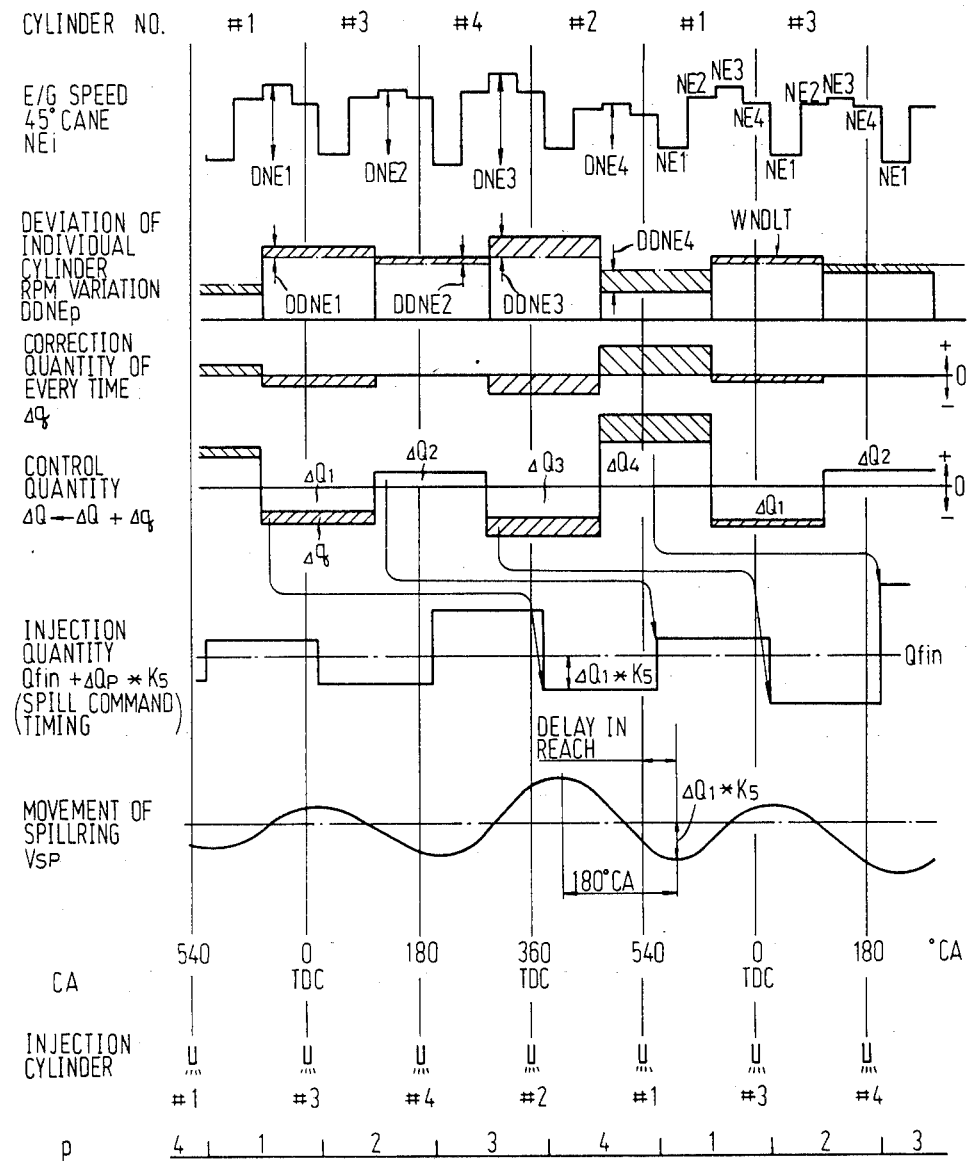
FIGS. 6 and 7 are graphic charts showing examples of signal wave forms in various portions in the prior art.
Figure 7:
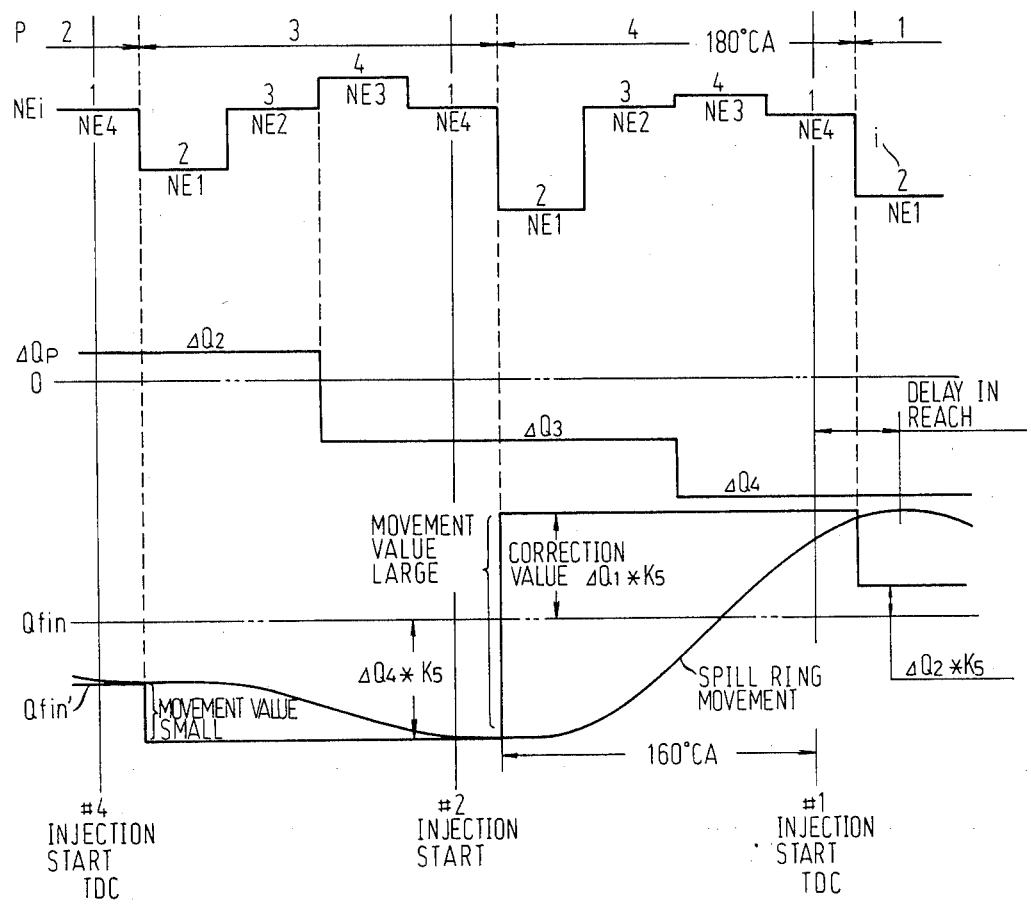
Figure 8:
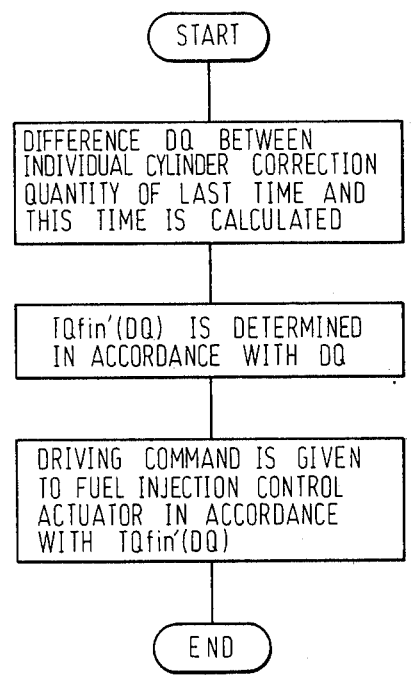
FIG. 8 is a flow chart showing the technical gist of the method of controlling individual cylinder fuel injection quantities in the electronicaly controlled diesel engine according to the present invention.

Subsequently, the routine proceeds to Step 130, where individual cylinder correction quantities $\Delta q$ of everytime are calculated through the following equation in accordance with the calculated deviation $DDNE_p$, from the relationship as shown in FIG. 5 for example.

$$\Delta q = f(DDNE_p) \qquad (5)$$

Then, the routine proceeds to Step 132, where the individual cylinder correction quantity $\Delta q$ obtained this time is integrated to the integrated quantity $\Delta Q_p$ integrated up to the last time as is shown in the following formula and stored as the quantity of this time.

$$\Delta Q_p \leftarrow \Delta Q_p + \Delta q \qquad (6)$$

Since the integrated quantity $\Delta Qp$ is associated with the respective cylinders, there are four quantities including $\Delta Q_1$ to $\Delta Q_4$.

The Steps 120-132 are included in a routine passing only when the counter i has the counted value 4, and hence, the routine passes immediately after the calculation of $NE_3$ is completed, namely, only once with 180° CA.

Figure 13:
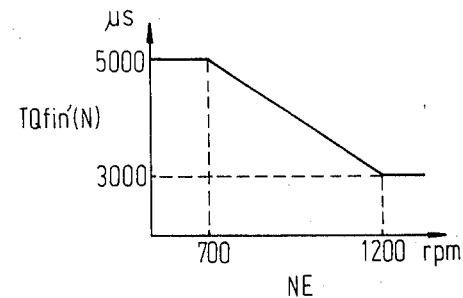
FIG. 13 is a graphic chart showing an example of the relationship between the engine speed and the engine speed corrected driving command timing as used in the above routine.

On the other hand, when the result of judgment in the Step 118 is negative, the routine proceeds to Step 140, where judgment is made as to whether the counted number of the counter i is 1 or not. When the result of judgment is positive, namely, judgment is made that it is immediately after the counted value of the counter is renewed in a sequence of 4 to 1, the routine proceeds to Step 142, where the present time is transferred to a memory $TNE_4$ from a free running timer proceeding at intervals of microseconds for example. Subsequently, the routine proceeds to Step 144, where an engine speed corrected driving command timing $TQ_{fin}'(N)$ corresponding to a mean engine speed NE is determined by using a map respresenting the relationship shown in FIG. 13, which has been previously stored in the ROM 58D. Then, the routine proceeds to Step 146, where the counter p is renewed. Subsequently, the routine proceeds to Step 148, where a difference DQ between an individual cylinder correction quantity $K_5 \times \Delta Q_p$ of last time and an individual cylinder correction quantity $K_5 \times \Delta Q_{p+1}$ of this time is calculated as shown in the following formula.

$$DQ \leftarrow K_5 |\Delta Q_{p+1} - \Delta Q_p| \tag{7}$$

Figure 14:
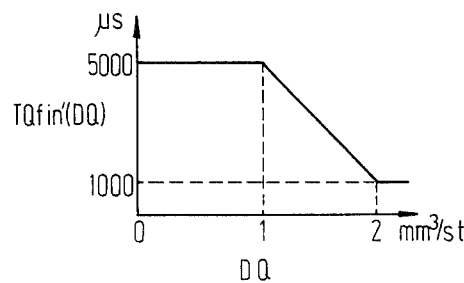
FIG. 14 is a graphic chart showing an example of the relationship between the difference between the individual cylinder correction quantities of last time and this time and the movement value corrected driving command timing as used in the above routine.

Then, the routine proceeds to Step 150, where a movement value corrected driving command timing $TQ_{fin}'(DQ)$ corresponding to the difference DQ is determined by using the relationship shown in FIG. 14 for example. Subsequently, the routine proceeds to Step 152, where, as shown in the following equation, whichever smaller, namely, earlier out of the engine speed corrected driving command timing $TQ_{fin}'(N)$ and the movement value corrected driving command timing $TQ_{fin}'(DQ)$ is selected to be the final command timing $TQ_{fin}'$.

$$TQ_{fin}' = \text{Min}[TQ_{fin}'(N), TQ_{fin}'(DQ)] \tag{8}$$

Then, the routine proceeds to Step 154, where, as shown in the following formula, the present time $TNE_4$ and the final command timing $TQ_{fin}'$ are added to each other and stored in the memory OCR, thus completing this interrupt routine ICI.

$$OCR \leftarrow TNE_4 + TQ_{fin}' \tag{9}$$

On the other hand, when the result of judgment in the step 120 is negative and the idling is unstable, when the result of judgment in the Step 122 is negative and the rotation is unstable due to misfire and the like, and when the result of judgment in the Step 140 is negative and the counted value of the counter i is judged to be neither 4 nor 1, the everytime correction quantity $\Delta q$ is not calculated, whereby the individual cylinder correction quantity $\Delta Q_p$ which is the integrated value thereof is not corrected, thus completing this interrupt routine ICI in this condition.

Figure 15:
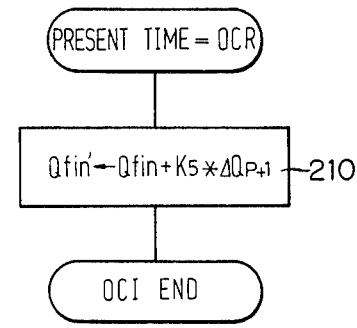
FIG. 15 is a flow chart showing the time coincidence interrupt routine for determining the final injection quantity as used in the above embodiment.

On the other hand, when the time of the free running timer coincides with the start timing OCR of a time coincidence interrupt routine determined in the Step 154, the routine proceeds to Step 210 of the time coincidence interrupt routine OCI as shown in FIG. 15, and the individual cylinder correction quantity $\Delta Q_{p+1}$ multiplied by the correction coefficient $K_5$ is added to the injection quantity $Q_{fin}$ determined from at least the mean engine speed NE and the accelerator opening Accp by a well known final injection quantity calculating routine as shown in the following formula so as to determine a final injection quantity $Q_{fin}'$, whereby a command is outputted to the spill actuator 34, so that the fuel injection by the final injection quantity $Q_{fin}'$ can be performed, thus completing this interrupt routine OCI.

$$Q_{fin}' \leftarrow Q_{fin} + K_5 \times \Delta Q_{p+1} \tag{10}$$

Figure 16:
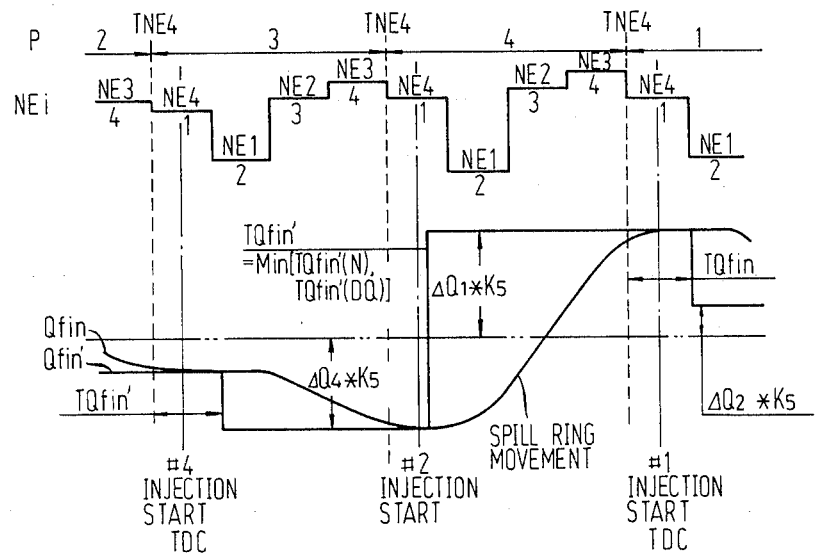
FIG. 16 is a graphic chart showing wave forms in various portions of the above embodiment.

FIG. 16 shows an example of the working wave form in the various portions in this embodiment. As apparent from the drawing, when the cylinder number counter p is renewed in the sequence of 3 to 4, in which the difference between the individual cylinder correction quentities of last time and this time is large and the delay in reach, which has heretofore been the problem, occurs, the difference $DQ = |\Delta Q_1 - \Delta Q_4| \times K_5$ is large, whereby the final driving command timing $TQ_{fin}'$ becomes small, and the final injection quantity $Q_{fin}'$ is outputted earlier. In consequence, at the time of the injection of No. 1 cylinder, the spill ring can move to the correction quantity $K_5 \times \Delta Q_1$ in a good timing, thus enabling to avoid the delay in reach. Additionally, this is practicable when the engine speed is high.

In this embodiment, the movement value corrected driving command timing $TQ_{fin}'(DQ)$ is guarded by the engine speed corrected command timing $TQ_{fin}'(N)$ obtained such that, the higher the engine speed is, the earlier the engine speed corrected command timing $TQ_{fin}'(N)$ is made, so that the command timing can be corrected not only by the movement value of the spill ring but also by the engine speed, thus enabling to effect a more proper control. Additionally, the guard by the engine speed corrected command timing in $TQ_{fin}'(N)$ can be dispensed with.

In the above embodiments, the present invention has been applied to the electronically controlled diesel engine in a motor vehicle, provided with the spill ring as being the fuel injection quantity control actuator, however, it is apparent that the scope of the present invention need not necessarily be limited to this, and the present invention is applicable to the diesel engine for general use provided with the fuel injection quantity control actuator of any other type.

What is claimed is:

1. A method of controlling individual cylinder fuel injection quantities in an electronically controlled diesel engine, wherein rpm variations with every explosion cylinder are detected and compared with one another, and a fuel injection quantity control actuator with every cylinder is controlled so as to make said rpm variations of the cylinders uniform, so that engine vibrations due to a dispersion in fuel injection quantity between the cylinders can be reduced, characterized in that the method comprises;

calculating a difference between the individual cylinder correction quantities of last time and this time;

determining a movement value corrected driving command timing to said fuel injection quantity control actuator in accordance with said difference; and giving a driving command to said fuel injection quantity control actuator with every cylinder in accordance with said movement value corrected driving command timing.

2. A method of controlling as set forth in claim 1, wherein the larger said difference is, the earlier said movement value corrected driving command timing is made.

3. A method of controlling as set forth in claim 1, wherein said movement value corrected driving command timing is guarded by an engine speed corrected driving command timing obtained such that, the higher the engine speed is, the earlier said engine speed corrected driving command timing is made.

4. A device for controlling individual cylinder fuel injection quantities in an electronically controlled diesel engine, comprising:

a fuel injection pump including a spill ring and a spill actuator, for controlling fuel injection quantities;

injection nozzles for injecting fuel discharged from said fuel injection pump into combustion chambers;

an accelerator sensor for detecting an accelerator opening;

an engine rotation sensor for detecting an engine speed; and a control unit for determining a target injection quantity at least from said accelerator opening and said engine speed, controlling said spill actuator so that the fuel of the target injection quantity can be discharged form said fuel injection pump, determining a movement value corrected driving command timing to said spill actuator in accordance with a difference between the individual cylinder correction quantities of last time and this time, and giving a driving command for eliminating a dispersion in rpm variations with every cylinder to said spill actuator in accordance with said movement value corrected driving command timing.

* * * * *

UNITED STATES PATENT AND TRADEMARK OFFICE
CERTIFICATE OF CORRECTION

PATENT NO. : 4,572,130

DATED : February 25, 1986

INVENTOR(S) : Keisuke Tsukamoto et al.

Page 1 of 2

It is certified that error appears in the above-identified patent and that said Letters Patent is hereby corrected as shown below:

Column 1, lines 29 and 30, change "comfortableness" to --comfort--.

Column 4, line 12, change "acuator" to --actuator--.

Column 4, line 57, change "electronicaly" to --electronically--.

Column 6, line 26, change "to an a" to --to as a--.

Column 6, lines 29, change "as a" to --as an--.

Column 6, line 46, change "eircuit" to --circuit--.

Column 6, lines 64, change "amplifter" to --amplifier-- and change "dircuit" to --circuit--.

Column 7, line 58, change "-0)," to --=0),--.

UNITED STATES PATENT AND TRADEMARK OFFICE
CERTIFICATE OF CORRECTION

PATENT NO. : 4,572,130

DATED : February 25, 1986

INVENTOR(S) : Keisuke Tsukamoto et al.

It is certified that error appears in the above-identified patent and that said Letters Patent is hereby corrected as shown below:

Column 9, line 63, change "quenti-" to --quanti---.

Column 11, line 5, change "form" to --from--.

Signed and Sealed this

Fifth Day of August 1986

[SEAL]

Attest:

DONALD J. QUIGG

Attesting Officer

Commissioner of Patents and Trademarks